Inventor:
Raymond F. Foster,
by Merton D Morse
His Attorney.

Inventor:
Raymond F. Foster,
by Merlon D. Moore
His Attorney.

United States Patent Office 2,852,602

Patented Sept. 16, 1958

2,852,602

NOISE ELIMINATION IN TELEVISION RECEIVER UTILIZING NOISE INVERTER AND AMPLIFIER

Raymond F. Foster, Syracuse, N. Y., assignor to General Electric Company, a corporation of New York Application February 16, 1952, Serial No. 271,941

18 Claims. (Cl. 178—7.5)

My invention relates to methods and circuits for cancelling received noise impulses in television receivers.

An important feature in the design of television receivers is the necessity of making the operation of its synchronizing circuits free from the effects of noise impulses received with the television signal which extend in amplitude beyond the synchronizing pulses. Such noise impulses, commonly referred to as "black noise" according to the television broadcasting standards employed in this country, may have enough energy to cause false operation of the synchronizing circuits. While various means for limiting and separating noise signals have been employed in the past, it is desired to provide improved noise immunity for the receiver synchronizing circuits.

It is an object of my invention to provide an improved method for cancelling high-amplitude noise impulses from a composite video signal.

It is another object of my invention to provide improved noise cancelling circuits for television receivers.

It is a further object of my invention to provide an amplitude selective signal cancelling circuit for which the selection or adjustment of circuit constants is not critical.

It is yet another object of my invention to provide a simple relatively improved circuit for providing noise immunity for television receiver synchronizing circuits without adversely affecting the operation of other circuits of the receiver.

According to my invention, portions of the demodulated composite received television signal extend beyond amplitude level near the peaks of the synchronizing pulses, which portions comprise the top portions of the so-called "black noise" impulses, are amplified to provide the noise cancelling impulses. All of the demodulated composite signal below that amplitude level is separately amplified to provide an amplified composite signal in which the "black noise" impulses are limited to an amplitude as near as feasible to that of the synchronizing pulse tips. The amplified signal and the amplified noise impulse portions are then combined in opposite phase to cancel the limited noise impulse portions from the amplified signal. The noise impulse top portions are sufficiently amplified to completely cancel at least the portions of the noise impulse in the noise-limited amplified signal above the tips of the synchronizing pulses. The noise impulses of strong signals are preferably cancelled to a level below the level of the video signal component so that critical adjustment of the various amplifying circuits which might otherwise be necessary for proper noise cancelling operation for signals of varying strength and having various noise impulse amplitudes is not required. Since the higher amplitude noise impulses might otherwise charge up the input circuit of the synchronizing pulse separator for intervals of several lines or hundreds of lines, loss of synchronization due to the effects of such noise impulses is avoided.

Figure 3:
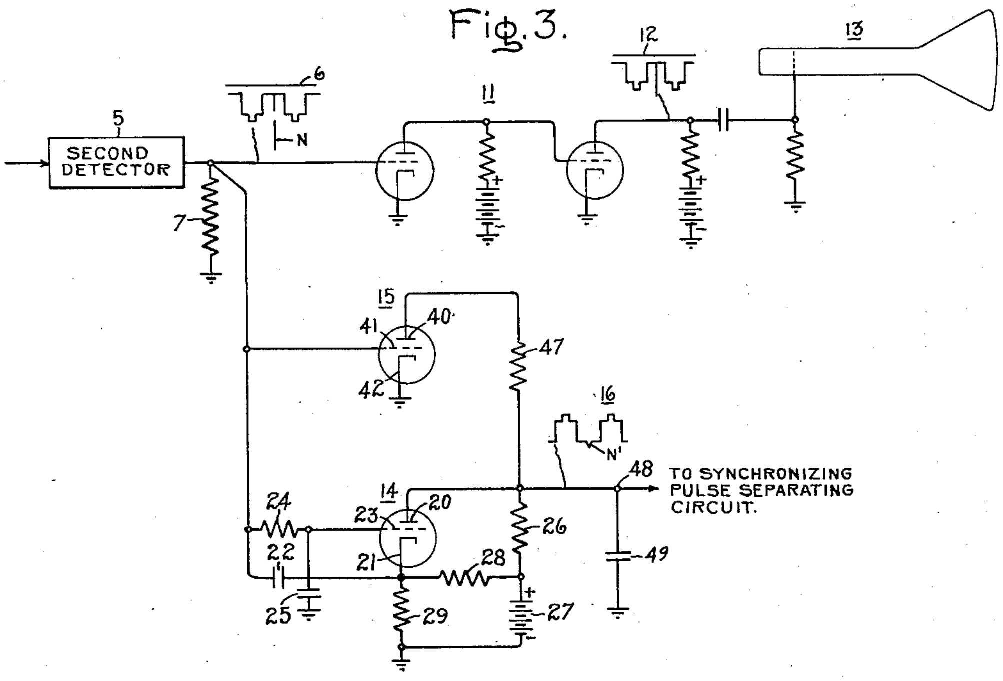
Figure 4:
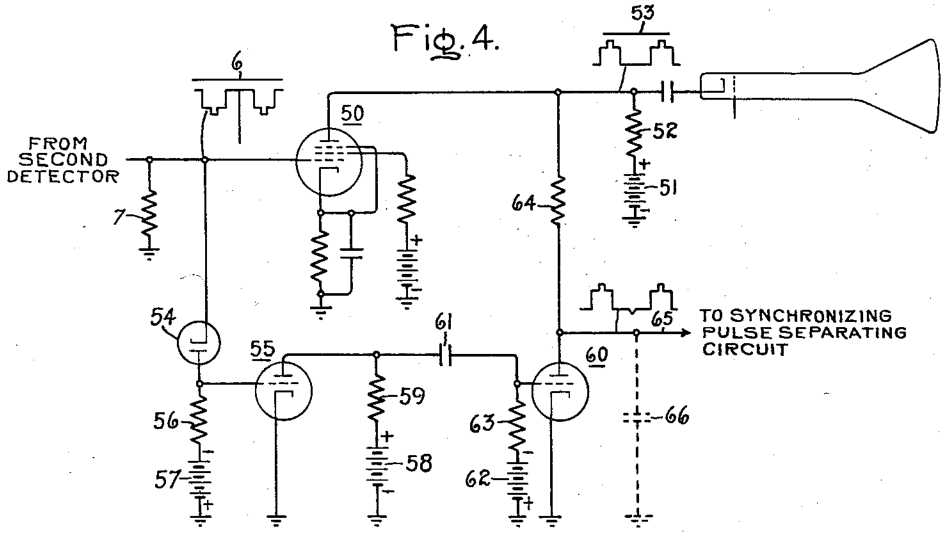

The novel features which I believe to be characteristic of my invention are set forth with particularity in the appended claims. The invention itself, however, both as to its organization and method of operation, together with further objects and advantages thereof, may best be understood by reference to the following description taken in connection with the accompanying drawing in which Fig. 1 is a circuit diagram partially in block form of television receiving apparatus having a noise cancelling circuit embodying my invention, Figs. 2*a* to 2*e* are signal representations illustrating the noise cancelling operation of the circuit of Fig. 1, and Figs. 3 and 4 are circuit diagrams representing other embodiments of my invention.

Figure 1:
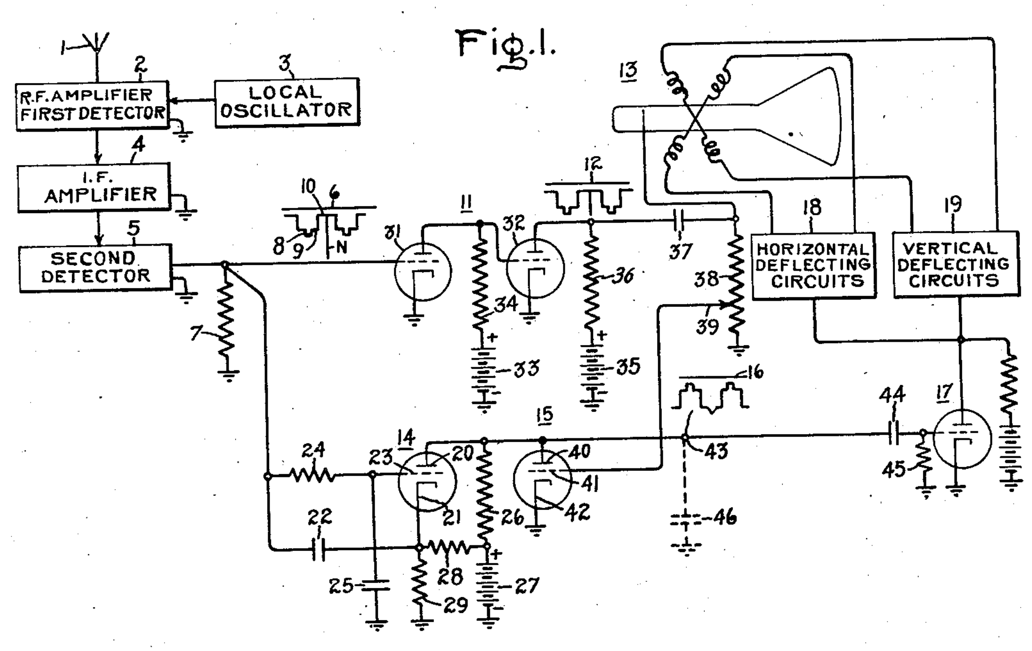

Referring now to the receiver of Fig. 1, signals received on antenna 1 are supplied to the radio frequency amplifier and first detector stages 2 where oscillations from the local oscillator 3 are heterodyned with the received signal to produce an intermediate frequency wave which is conventionally amplified in the intermediate frequency amplifier 4. The intermediate frequency carrier is demodulated in the second detector 5 to provide a composite video signal voltage as indicated at 6 across a load resistor 7. As shown in the particular embodiment of Fig. 1, the video signal 6 is negative with respect to ground and has negative going synchronizing pulses 8 which extend beyond the blanking pedestals 9 in the so-called "blacker than black" or "supersync" region. The video signal component 10 is illustrated between the blanking pedestals, being shown at the minimum or white level in the illustrated signal portion 6. Negative-going or "black" noise impulses N in the video signal 6 are also indicated and may be dispersed at random in the signal. Such noise impulses, while usually of short time duration compared with the synchronizing pulse period, may commonly have amplitudes 10 to 20 times greater than the synchronizing pulses in the second detector output signal.

The composite signal 6 of Fig. 1 is amplified in the video amplifier 11 which is also operated as a noise limiter to provide an amplified output signal 12 in which the noise impulse amplitude has been conventionally limited to a value near but greater than that of the tips of the synchronizing impulses, as will be explained in a later paragraph. This amplified output signal is applied to the electron gun of the cathode ray tube 13 in a conventional manner for reproduction of the televised image represented by the video signal.

The noise cancelling circuit comprises a noise amplifier stage 14 supplied with input signals from the second detector 5 and a signal amplifier stage 15 supplied with the amplifier video signals from the video amplifier output circuit. These amplifiers are provided with a common output circuit in which the noise impulses of combined output signals 16 are cancelled is explained in detail hereinafter. This output signal 16 is supplied to the input circuit electrode of the synchronizing pulse separating or clipper stage 17 where the synchronizing impulses are separated from the portions of the signal below the blanking level and supplied to the horizontal and vertical deflection circuits 18 and 19 respectively. The output of these circuits is in turn conventionally coupled to the deflection coils or other scanning means of the cathode ray tube 13.

Referring now to the noise amplifier 14 of the noise cancelling circuit, the amplifier may suitably comprise an electron discharge device, such as a triode vacuum tube. In order to provide an amplified output signal at the anode 20 of the amplifier 14 having negative-going "black" noise impulses N, the signal from the second detector 5 which appears across the resistor 7 is coupled to the cathode 21 of the amplifier 14 through a coupling capacitor 22. This permits the cathode to be driven in a negative direction during the occurrence of the noise impulses N. The control electrode 23 of the noise amplifier 14 is maintained at the average direct current voltage level of the signal 6 by a low-pass filter which may suitably comprise a resistor 24 connected between the control grid and the signal source and a bypass capacitor 25 between the control grid and ground. The anode 20 is connected through a load resistor 26 to the positive terminal of a direct current voltage source, which is conventionally represented as a battery 27 having its negative terminal returned to ground.

The input voltage range for which the noise amplifier 14 is operative is selected by placing its cathode 21 at a slightly positive potential. This may be suitably accomplished by connecting the cathode to the common junction of a pair of voltage dividing resistors 28 and 29 connected in series between the positive terminal of the battery 27 and ground. The control grid 23 of the noise amplifier is thus at a negative voltage corresponding to the average value of the video signal 6 and is made more negative with respect to the cathode 21 by reason of the positive bias on the cathode. The amplifier 14 accordingly conducts only when the negative-going excursions of the signal 6 applied to its cathode 21 are of sufficient amplitude to overcome the bias. By adjusting the resistances of the voltage divider resistors 28 and 29, the bias of the control grid with respect to the cathode may be selected to locate the anode current cut-off input voltage level near the tips of the synchronizing pulses 8 of the input signal 6. Thus only noise impulses extending in a negative direction beyond this particular voltage level appear at the anode 20 of the amplifier 14. A high gain tube is preferably selected for the noise amplifier 14 in order that the noise pulse portions may be amplified by several times to provide complete cancellation or inversion as will be described later. If desired, several stages of noise amplification may be provided and the input signals may be applied to either the cathode or control grid of the input circuits of the amplifier stages to provide the desired phase of the ultimate output signal.

The output signal 6 from the second detector 5 is also amplified as previously mentioned in a video amplifier 11, which, as shown in Fig. 1, may suitably be a conventional two-stage amplifier employing triode vacuum tubes 31 and 32. The detected signal 6 is applied to the control grid of the first triode 31 and a positive voltage is applied to the triode anode from a direct current voltage source 33 through a load resistor 34. The cathode of the tube 31 and the negative terminal of the voltage source 33 are suitably returned to ground. In order to reduce the amplitude of the noise impulses to an amplitude level relatively near that of the tips of synchronizing pulses of the signal 6, the circuit parameters are selected so that the grid voltage of the triode 31 near the tips of the synchronizing impulses of the applied input signal 6 corresponds to the anode current cutoff for that tube.

It should be understood that while it would be desirable to limit noise in the video amplifier to the level of the synchronizing pulse peaks, this is not readily or consistently accomplished as long as signals of various amplitudes and having varying average values are presented to the video amplifier. The cutoff level must therefore be adjusted so as not to cut off the synchronizing pulses of high amplitude signals even though less satisfactory noise limiting is obtained for lower amplitude signals. The most feasible cutoff level will accordingly be above the synchronizing pulse peaks of other than the strongest signals and generally corresponds to the noise cutoff level selected for the highest level signal from the second detector. Ordinarily this cutoff level will be the same as that of the noise amplifier 14 where the same considerations apply.

Further amplification of the video signal is obtained by coupling the anode of the triode 31 to the control electrode or grid of the second stage triode 32. With the cathode of the triode 32 connected to ground and the anode connected to the positive terminal of a direct current voltage source 35 through a load resistor 36, an amplified output signal 12 appears at the anode of the triode 32 having substantially the same phase as the input signal 6 supplied to the input circuit of the first triode 31. The signal may be suitably coupled from the anode of the amplifier tube 32 to the control grid of the cathode ray tube 13 by a coupling capacitor 37. A cathode ray tube grid resistor 38 is preferably connected between the cathode ray tube grid and ground, thus reducing the effect of fluctuations of the voltage supply 35 upon the level of the output signal appearing across the resistor 38.

A portion of the signal appearing across the cathode ray tube grid resistor 38 at a tap 39 thereon is supplied to the input circuit of the signal amplifier 15 of the noise cancelling circuit. This amplifier may suitably comprise an electron discharge device such as a vacuum tube triode having its anode 40 directly connected to the anode 20 of the noise amplifier 14 so that the output load resistor 26 and direct current voltage source 27 are common to amplifiers 14 and 15. If desired, the triodes of amplifiers 14 and 15 may suitably be incorporated in a common envelope. The circuit parameters for the noise cancelling amplifier 15 are chosen to provide additional noise limiting in that stage. Accordingly, the tap 39 on the cathode ray tube grid resistor 38 to which the control grid 41 of the tube 15 is connected is adjusted so that the voltage near the tips of the negative-going synchronizing pulses of a strong input signal applied to the grid 41 corresponds to the anode current cutoff point for the amplifier 15. The cathode 42 of the tube 15 may suitably be returned to ground. Further noise limiting of the video signal is thus obtained in the amplifier 15 while, at the same time, the output signal 16 appearing at the anode of the amplifier 15 is amplified and inverted in phase so that the synchronizing pulses are positive going.

According to my invention, since the output resistor is common to the amplifiers 14 and 15, the negative-going amplified top portions of noise pulses tending to appear at the anode of amplifier 14 cancel the limited or bottom portions of the positive going noise pulse of the amplified signal tending to appear at the anode of the amplifier 15. In the resulting combined signal 16, which appears at an output terminal 43 connected to the anodes of tubes 14 and 15, the high amplitude noise impulses are cancelled. At least for strong signals, the noise impulses are preferably inverted so that the high amplitude "black" noise impulses of the input signal 6 become "white" noise impulses in the signal 16, this degree of cancelling assuring satisfactory noise cancelling for low level signals or signals in which the separated or clipped noise cancelling signal is not large.

The noise cancelling circuit output terminal 43 is connected to the synchronizing pulse separating circuit 17, which may, for example, comprise a triode discharge device having a long time constant input RC network. This network may suitably comprise a coupling capacitor 44 connected between terminal 43 and the triode control grid and a grid leak resistor 45 connected between the control grid and cathode. It is characteristic of this type of circuit that high amplitude positive-going input signals bias the grid to cut off anode current until the capacitor discharges. Noise impulses in the signal supplied to the synchronizing pulse separating circuit 17 having a value exceeding the peaks of the synchronizing pulses thus may cause cut-off of the separator triode anode current for many pulse periods. This is avoided by limiting the input noise level according to my invention. If desired for any particular synchronizing circuit, the noise cancelling circuit can be adjusted so that no vestige of the higher energy-noise impulses remains in the input signal of the separator circuit 17. For example, the cancelling noise impulses may be amplified to a sufficient extent to cancel all portions of the higher amplitude noise impulses above the blanking level.

Considering separately the operation of amplifiers 14 and 15 of the noise cancelling circuit, the clipped amplified noise signal top portions at the anode of the noise amplifier 14 have a greater amplitude than the portions of the limited noise impulses at the anode of the noise cancelling amplifier 15 which are above the synchronizing pulse peaks. Since the signal in common output circuit of the amplifiers 14 and 15 does not affect the signal at the grid of the cathode ray tube 13, a more than complete cancellation of the noise whereby an inverted or "white" noise signal appears in the common output circuit does not affect the operation of the video circuits. Complete cancellation of the noise is thus assured for operation of the synchronizing pulse separating circuit 17 for signals of various received levels without critical adjustment of the various applied voltages.

Good noise cancellation is partially dependent upon the charging time of the capacitance to ground of the common output circuit, which capacitance is represented by the capacitor 46 shown in dotted outline connected between the terminal 43 and ground. This capacitance includes the anode to cathode capacitances of the amplifier stages 14 and 15 as well as the input capacitance of the synchronizing pulse separating circuit 17.

Figures 2A, 2B, 2C, 2D, 2E:
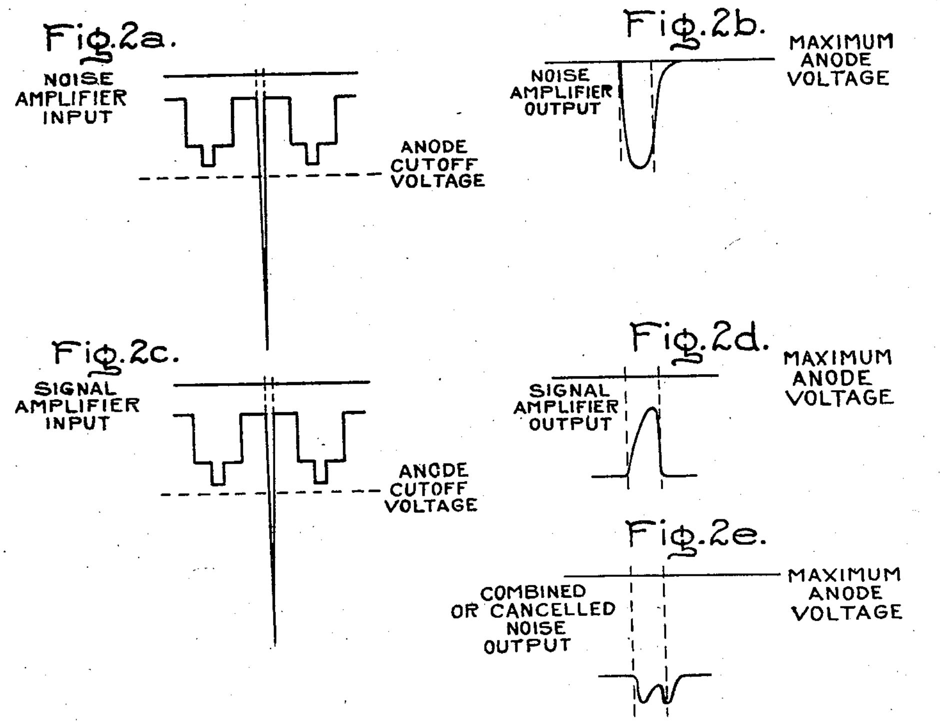

The effect of the capacitance 46 can be seen by reference to Figs. 2*a* to 2*e* in which the noise cancelling action is illustrated. Thus as shown in Fig. 2*a*, an input signal at the cathode 21 of the noise amplifier triode 14 may have relatively high amplitude noise impulses which are clipped or separated from the video signal at an anode cutoff level which is dependent upon the bias on the triode cathode. Only those portions of the noise impulses extending in a negative direction below the cutoff voltage appear in the output signal developed across the common output resistor 26. The output pulse shown on an amplified time scale in Fig. 2*b* is that due to the separated noise pulse portion alone which would be obtained if the signal amplifier 15 were disconnected from the common output circuit. While the input noise portions of Fig. 2*a* may be assumed to approach a square-wave form having very large rates of increase and decrease, the noise output pulse at the anode 20 of the noise amplifier 14 is distorted due to the time constants of the resistance-capacitance circuits in the noise amplifier output circuit. The critical components of this RC circuit at the beginning of the noise impulse when the tube 14 is rendered conductive are the capacitance 46, and the plate resistance of the triode 14 in parallel with the resistance of the common output resistor 26. A negative going noise impulse at the cathode of the triode 14 in effect switches the tube 14 on, decreasing its plate to cathode resistance to a low value and causing a rapid voltage drop at the anode 20 due to the current flow through the resistor 26. The time constant referred to is very short, and the time required for the output pulse to reach its full amplitude as shown in Fig. 2*b* is not substantially retarded by the time required to discharge the capacitance 46.

However, at the end of the noise impulse, the triode 14 suddenly becomes non-conductive, and time required for the anode to attain the full voltage of the source 27 again, however, will depend upon the time constant of an RC circuit consisting of the capacitance 46 and the output resistor 26. Accordingly, the time required for the output pulse of Fig. 2*a* to decay broadens the base of the output of Fig. 2*b* to form a noise cancelling pulse which is actually broader, that is, of longer time duration, than the actual noise impulse of the input signal.

At the same time, the limited negative-going noise impulse at the control grid 41 of the noise-limiting signal amplifier 15, as shown in Fig. 2*c*, effectively switches additional plate resistance in circuit at the beginning of the limited noise pulse and switches the plate resistance out at the end of the noise impulse. As indicated in Fig. 2*d*, the sudden increase in the plate impedance of the amplifier 15 at the beginning of input noise pulse results in a rise of voltage at the anode due to the decreased current. The voltage cannot rise instantaneously, however, because of the time required to charge the capacitance 46 through the load resistor 26, this time constant corresponding to that controlling the rate of decay of the amplified noise pulse portion at the anode of amplifier 14. At the end of the applied input pulse of Fig. 2*c* when the impedance of the tube 15 is decreased, the capacitor 46 is discharged through the parallel combination of the load impedance 26 and the reduced plate or anode impedance of the tube 15 in parallel. The time constant of the discharge circuit is accordingly smaller than that of the capacitor charging circuit, and the decay of the output noise impulse at the plate of the amplifier 15 is not materially retarded as shown in Fig. 2*d*. The output noise pulse of Fig. 2*d* should be understood to be that obtained if the noise amplifier 14 were disconnected from the common output circuit.

The resistance of the common load resistor 26 is several times greater than the plate resistance of either triode 14 or 15 during conduction and the maximum value of resistor 26 is preferably limited so that the amplitude of the line synchronizing pulses in the output signal 16 is not excessively attenuated by integrating action for a given value of capacitor 46. This value can be significantly expressed in terms of the time constant of the capacitance 46 and the load resistance associated with the signal amplifier 15 when a synchronizing pulse is applied to the amplifier input circuit. Since the time constant under such conditions represents the time for capacitance 46 to be charged to 63.2% of the amplitude corresponding to the amplified pulse amplitude, the time constant of the charging circuit should therefore be a substantial portion of the pulse duration in order to increase the effectiveness of the noise cancelling action but less than the pulse width to prevent excessive pulse amplitude attenuation. The resistance of resistor 26 is assumed as the sole load circuit resistance for this purpose.

The energy content or effective time duration of the cancelling pulses at the anode of the noise amplifier 14 is thus increased while the upper portion of the limited noise impulses at the anode of the signal amplifier 15 is attenuated and decreased in time duration to make the noise cancelling impulses more effective. Even if the input noise pulse departs from a square wave form to the extent that the limited portion of the noise signal at the input circuit of the amplifier 15 is of a materially longer time duration than the tops of the same noise impulses at the input circuit of the nose amplifier 14, complete cancellation may still be effected.

As shown in Fig. 2*e*, the output signals when superimposed produce a signal 16 in which the high amplitude noise pulses, i. e., those which were received with an amplitude substantially greater than that of the synchronizing pulses, are actually inverted so that in an output signal with positive-going synchronizing pulses, the formerly positive-going impulses are inverted to extend in a negative direction. This represents a greater degree of noise cancellation than necessary for proper operation of the separating circuit of Fig. 1, but with the same various component values and voltages, sufficient noise cancellation with also be obtained under more difficult signal reception conditions.

Referring now to Fig. 3, another embodiment of my invention is shown in which the second detector 5 of a television receiver corresponding to that the receiver illustrated in Fig. 1 provides a detected composite video signal 6 across a detector load resistor 7. As in the receiver described in connection with Fig. 1, the composite video signal 6 is amplified by a video amplifier 11 to provide an amplified composite video signal 12 having limited amplitude noise impulses, the signal being supplied to the electron gun of the cathode ray tube 13 for reproducing the televised image.

The cathode bias of the amplifier 14 is selected so that plate current cutoff occurs near the tips of the synchronizing impulse of the input signal. Only that portion of the signal extending beyond this level, that is, the tips of the noise impulses, are thus selected for amplification. Considering the operation of the noise amplifier 14 independently of the signal amplifier 15, the noise impulses at the anode 20 are negative-going. It is obvious, of course, that amplified noise impulses can be obtained by such arrangements, for example, as a two-stage amplifier with control grid input coupling.

As distinguished from the noise cancelling circuit of Fig. 1, the input signal to the control grid 41 of the signal amplifier 15 of Fig. 3 is supplied directly from the second detector 5 rather than from the video amplifier 11. Amplification of the signal supplied to the synchronizing pulse separator is thus independent of the video amplifier circuits. The cathode 42 of the triode 15 is suitably connected to ground. An additional load resistor 47 is connected in series in the output circuit between the anode 40 of the triode 15 and the common lead impedance 26. The amplifier 15 is suitably operated as a noise limiter by appropriate selection of the circuit parameters and, as in the operation of the circuit of Fig. 1, the most practical anode current cutoff point is more negative than the tips of the synchronizing impulses of at least the weaker input signals. The base portions of the noise impulses are unavoidably amplified, and it is these portions which must be at least partially cancelled in the common output circuit.

In operation of the circuit of Fig. 3, the negative-going noise impulses at the anode of triode 14 cancel the limited noise impulses at the anode of the triode 15. To provide an amplified noise pulse portion of sufficient amplitude to adequately cancel or invert the limited noise pulse from the amplifier 15, the ratio of the resistances of resistor 47 to resistor 26 is preferably adjusted so that at their common terminal, which is also connected to the anode 20 of amplifier 14, the negative noise impulses from the amplifier 14 are larger than the portions of the corresponding noise impulses of the signal from the amplifier 15. The resistors 47 and 26 thus act as a voltage divider. If the gain of the noise impulse amplifier 14 is sufficiently large as compared with the gain of the noise cancelling amplifier 15, the resistor 47 need not be employed and the anodes of triodes 14 and 15 may be directly connected. Other means of adjusting the relative gains of the two stages are apparent to anyone skilled in the art and are in part dependent upon the characteristics of the tubes employed and upon the number of stages utilized in each amplifier.

Terminal 48, which is connected to the common terminal of resistors 26 and 47, is suitably coupled to the synchronizing pulse separating circuits. A capacitor 49 is shown connected between point 48 and ground which includes that capacitance to ground which, as described in connection with capacitance 46 of Fig. 1, modifies the output pulse shapes. Capacitor 49 may suitably be an additional capacitor inserted in the circuit and is indicated as such in the drawing, although in most cases the internal capacitances of the amplifier tubes and the input capacitance to the synchronizing pulse separating circuits is adequate to help broaden the cancelling signal and narrow the cancelled signal.

Another embodiment of my invention is shown in Fig. 4 where a portion of the television receiver associated with the noise cancelling circuit is diagrammatically illustrated. As in Fig. 1, the detector is connected to provide a signal 6 with negative-going synchronizing impulses across the second detector load resistor 7. This signal 6 is impressed upon the control grid of the video amplifier discharge device which may suitably be a pentode 50 conventionally connected to provide an amplified output signal at its anode, the anode being connected to a source of positive voltage 51 through a load resistor 52. The anode is coupled to the cathode of the cathode ray tube 13 through a coupling capacitor to provide an amplified signal 53 with positive going pulses thereto. In the video amplifier 50, the noise impulses are also conventionally limited to a level near the tips of the synchronizing pulses of the input signal by operating the amplified with the tips of the synchronizing pulses of the input signal near that input voltage corresponding to anode current cutoff.

As in Fig. 1, the circuit of Fig. 4 amplifies portions of noise impulses extending above the tips of the synchronizing pulses of the composite signal 6. As shown in Fig. 4, this may be accomplished by providing a rectifier 54 and a triode discharge device 55 for respectively separating and amplifying the noise pulse portions. Thus the rectifier 54, which may suitably be a diode discharge device, has its cathode connected to the output circuit of the second detector and its anode connected to ground through a load resistor 56 and a source of direct current voltage 57. This source is shown as a battery arranged in circuit to provide a small negative bias voltage with respect to ground at the diode anode. Because of the bias thus applied to the rectifier, it cannot conduct unless the signal voltage applied exceeds the bias. Accordingly, negative excursions of the signal 6 tend to drive the cathode of the diode 54 more negative than its anode but only those excursions greater in amplitude than the bias applied to the diode anode can cause conduction. With the bias level set near the tips of the synchronizing pulses, the portions of the noise impulses extending beyond this level flow as current impulses through the load resistor 56 thus causing a signal voltage at the diode anode. This voltage is applied to the control electrode of the amplifier 55, the cathode of the amplifier being grounded and its anode being connected to the positive terminal of a unidirectional voltage source, conventionally indicated as a battery 58 through an output lead resistor 59.

The clipped or separated portions of the negative-going noise impulses of the input signal 6 are reversed in phase to appear as positive-going impulses at the anode of the triode 55. These impulses are coupled to the control electrode of a second noise amplifier 60 through a coupling capacitor 61 which may suitably comprise a triode discharge device provided with a negative bias from a bias voltage source 62 connected in series with a resistor 63. The anode of amplifier 60 is connected to the anode of the noise limiting pentode 50 through a load resistor 64. Positive-going noise impulses at the input circuit of the triode 60 are thus amplified to appear as negative-going noise impulses at the amplifier anode. Since the output signal from the triode 60 is developed across resistors 64 and 52 in series, the amplitude of the noise impulses at the triode anode is greater than at the common terminals of the resistors 52 and 64 in the video output circuit.

Accordingly, while the cancellation of the negative noise impulses from the triode 60 with the remaining noise pedestals in the signal from the video amplifier 54 may not be complete in the video output circuit, sufficient cancellation is obtained at terminal 65, which is directly connected to the anode of the triode 60 where the full amplitude of the negative-going amplified noise signals cancels and preferably inverts the noise impulses of the signal from the video amplifier 50. The synchronizing pulse separating circuit is connected to terminal 65 in order that synchronizing pulses may be separated from the remainder of the signal as previously described. While the amplified noise cancelling noise impulses may affect the video signal applied to the cathode of the cathode ray tube, by proper proportioning of the resistors 64 and 52 the noise cancelling in the video circuit is limited to an extent where the noise is not actually inverted so as to produce the so-called white noise. At the same time, noise cancellation is complete at the input to the synchronizing circuits to produce the advantages previously described. Capacity 66 corresponding to capacity 43 of Fig. 1 is shown in dotted outline between terminal 65 and ground to permit noise cancellation operation of the nature previously described.

Reviewing the method employed in practicing my invention, it is seen that separating or limiting amplitude levels beyond a given level are successfully employed to provide cancellation of large amplitude impulses at least down to the given level. Accordingly, the portions of signals from the signal source which extend beyond the separating level, which is near but greater than the synchronizing pulse level, are separated and amplified to produce a train of amplified noise impulse portions. At the same time, the portions of signals from the source which are below a similar separating level are separately separated and amplified to produce an amplified signal with limited noise impulses. These amplified signals are combined in opposite phase so that the noise impulses are at least partially cancelled from the amplified signal. As the separating level is preferably the same for both the signal and the noise amplification, the portions of the signal on either side of a given level are thus separately amplified before being recombined, and the amount of amplification is controlled to provide an amplified noise signal of at least as great an amplitude as the undesired portion of the limited noise impulse in the amplified signal.

Thus by amplifying both the noise impulse portions and the signal before recombining them, the advantages of noise cancellation are obtained for both greater amplification of the cancelling impulse and greater relative limiting of the pulse to be cancelled. In addition, the resultant signal supplied to the synchronizing circuits has been amplified in the process of noise cancellation, thus avoiding a need for a subsequent signal amplifying step.

While I have shown and described various specific embodiments of my invention, and certain modifications thereof, it will, of course, be understood by those skilled in the art that other modifications may be made without departing from the principles of the invention. I, therefore, contemplate by the appended claims to cover any such modifications as fall within the true spirit and scope of my invention.

What I claim as new and desire to secure by Letters Patent of the United States is:

1. In a television receiver for the reception of a composite unidirectional video signal comprising a video component and a train of synchronizing pulse components extending near a given level above the video component, a source of such signals having random impulse components with amplitudes exceeding said given level, a first means coupled to said source for separating and amplifying portions of signals including portions of said random impulses therefrom having an amplitude below said given level, a second means coupled to said source for separating and amplifying portions of said random impulses having an amplitude above said level, and means for combining the amplified output signals from said first and second means in opposite phase for cancelling at least a portion of each of said random impulses from the combined signal.

2. In a television receiver for the reception of a composite unidirectional video signal comprising a video component and a train of synchronizing pulse components extending near a given level above the video component, a source of such signals subject to interfering impulses extending to an amplitude above said given level, first discharge device means coupled to said source for amplifying portions of signals including said interfering impulses therefrom having an amplitude below said given level, a second discharge device means coupled to said source for amplifying in opposite phase portions of interfering pulses therefrom having an amplitude above said level, and a common output circuit for said first and second discharge device means whereby at least a portion of each of said interfering impulses is cancelled.

3. In a television receiver for the reception of a composite video signal comprising a video component and a train of synchronizing pulse components of uniform amplitude extending near a given level above the video component, a source of such signals subject to interfering impulses extending to an amplitude above said given level, a first means for amplifying only components of a signal from said source including portions of said interfering impulses which are below said level, a second means for amplifying portions of said interfering impulses from said source which extend above said synchronizing pulse amplitude, and means for applying the amplified signal portions from said first and second means in opposite phase to a common output circuit.

4. In a television receiver for the reception of a composite unidirectional signal comprising a video component and a train of synchronizing pulses of a given polarity extending above the video component to a given amplitude level, a source of such signals subject to interfering impulses of said polarity extending above said level, and first and second discharge device amplifiers each having an input circuit coupled to said source and having a common output circuit, said first discharge device amplifier being arranged to amplify only portions of said signal below an amplitude level near said given level to provide an amplified signal in said output circuit having positive-going synchronizing pulses, said second discharge device amplifier being arranged to amplify only portions of said interfering impulses which extend beyond said level to provide amplified negative-going impulse portions for cancelling the corresponding positive-going impulse portions from said first amplifier in said common output circuit.

5. In a television receiver for the reception of a composite unidirectional signal comprising a video component and a train of synchronizing pulses of a given polarity extending above the video component to a given amplitude level, a source of such signals including interfering impulses of said polarity extending above said level, and first and second signal amplifiers each having an input circuit coupled to said source and a common output circuit, said first amplifier having an amplifying range limited to signal components below an input amplitude near said given level, said second amplifier having an amplifying range limited to signal components above an input amplitude near said given level, said amplifiers being adapted to provide amplified output signals of opposite polarity to said output circuit whereby at least a portion of said interfering impulses is cancelled.

6. In a television receiver for the reception of a composite unidirectional signal comprising a video component and a train of synchronizing pulses of a given polarity extending above the video component to a given amplitude level, a source of such signals including interfering impulses of said polarity extending above the said level, a first amplifying means having an input circuit connected to said source, said amplifying means adapted to amplify signals having an input amplitude below a level near said given amplitude, rectifying means connected to said source, said rectifying means being biased to pass only portions of input signals having an amplitude above said given level, a second amplifying means having an input circuit coupled to said rectifier, a common output circuit for said first and second amplifying means, said amplifying means being arranged to provide amplified output signals to said output circuit in opposite phase, and means for connecting said common output circuit to a synchronizing pulse separating circuit.

7. In a television receiver for the reception of a composite unidirectional signal comprising a video component and a train of synchronizing pulses of a given polarity extending above the video component to a given amplitude level, a source of such signals including interfering impulses of said polarity extending above said level, a video amplifier having an input circuit and an output circuit, said video amplifier adapted to amplify signals having an input amplitude below a level near said given amplitude level, means for coupling said input circuit to said source, means for coupling said output circuit to a video reproduction means, rectifying means connected to said source, means for biasing said rectifying means to permit conduction therethrough of portions of input signals having an amplitude above said given level, a second amplifier having discharge device input and output electrodes, said means connecting said input electrode to said rectifier, resistive means for coupling said output electrode of said second amplifier to said output circuit of said video amplifier to provide a common output circuit therewith, said second amplifier being arranged to supply output signals to said output circuit in opposite phase with respect to output signals from said video amplifier, and means for coupling said output electrode of said second amplifier to a synchronizing pulse separating circuit.

8. In a television receiver having a source of composite unidirectional signals comprising a video component, a train of synchronizing impulses of a given polarity extending above the video component to an amplitude near a given amplitude level, and additional undesired signal impulses of said polarity extending above said level, a video amplifier having an input circuit coupled to said source and an output circuit coupled to an intensity control means of a cathode ray tube, first and second discharge device amplifiers having a common output circuit, said first amplifier having an input circuit coupled to said source, means for limiting the amplifying range of said first amplifier to input signal portions extending above said amplitude level, said first amplifier being arranged to supply amplified negative-going impulses to said common output circuit, said second amplifier having an input circuit coupled to the output circuit of said video amplifier, means for establishing the amplifying range of said second amplifier to signal components below an amplitude level corresponding to said given amplitude level, said second amplifier being arranged to supply an amplified signal to said common output circuit with the synchronizing impulses thereof positive-going, and means for coupling said common output circuit to a synchronizing pulse separating circuit.

9. In a television receiver having a source of composite unidirectional signals comprising a video component, a train of synchronizing impulses of a given polarity extending above the video component to an amplitude near a given amplitude level, and additional undesired impulses of said polarity extending above said level, a video amplifier having an input circuit coupled to said source and an output circuit coupled to an intensity control means of a cathode ray tube, first and second discharge device amplifiers each having an output anode with a common connection to an output circuit comprising an impedance and a unidirectional voltage source, said first amplifier having an input circuit coupled to said source in proper polarity to provide amplified negative-going impulses at the first amplifier output anode, means for limiting the amplifying range of said first amplifier to input signal portions extending above said amplitude level, said second amplifier having an input circuit coupled to the output circuit of said video amplifier in proper polarity to provide amplified positive-going impulses at the second amplifier output anode, means for limiting the amplifying range of said second amplifier to signal components below an amplitude level corresponding to said given amplitude level, capacitance effectively connected in shunt across said output circuit, said impedance and said capacitance having a time constant equal to a substantial part of the pulse duration, and means for coupling said common connection of said output anodes to a synchronizing pulse separating circuit.

10. In a signalling apparatus adapted to respond to a useful signal normally lying within a given amplitude range, electronic apparatus for minimizing the effect of spurious noise that extends outside the amplitude range and which may be combined with the useful signal comprising in combination limiting means adapted to receive the useful signal and the spurious noise combined therewith, means whereby said limiting means is adapted to pass only those signals lying below an amplitude level above said range, electronic means adapted to receive said useful signal and said spurious noise, means whereby said electronic means is adapted to pass only the portion of those signals that are outside of said range, and means for subtracting the output of said electronic means from the output of said limiting means.

11. In a television receiver having portions thereof adapted to respond to a unidirectional composite signal including video signals, synchronizing signals extending beyond the extreme amplitude allotted to the video signals and any spurious noise signals that may be present, electrical apparatus for minimizing the effects of the spurious noise signals which extend beyond the maximum amplitude of the synchronizing signals comprising in combination limiting means adapted to receive said composite signal, means whereby said limiting means is adapted to pass only those components of the composite signal that have less then a predetermined amplitude level that is close to the peaks of the synchronizing signals, electronic means adapted to receive said composite signal, means whereby said latter means is adapted to pass only those portions of the signals that have an amplitude such that they extend beyond a predetermined level that is above the peak amplitude of the synchronizing signals, and means for coupling the output of said limiting means and said electronic means together so that the portion of the noise signals passed by said electronic means are subtracted from the portion of the corresponding noise signals passed by said limiting means.

12. In signalling apparatus having at a point in the circuit thereof a useful signal lying within a predetermined amplitude range, means for minimizing the effects of spurious noise signals that are mixed with the useful signal and which extend outside of said range comprising in combination first electron discharge means having input and output electrodes, means for coupling said input electrode to said point, said first current conducting electron discharge means being such as to pass only portions of those signals applied to its input electrode that lie below a predetermined amplitude level that is outside of said range, a second electron discharge means having an input electrode and an output electrode, means for coupling said input electrode to said point, said first and second electron discharge means being adapted to produce signals at their output electrodes having opposite phases, means for biasing said second electron discharge device so that it can pass to its output electrode only portions of those signals applied to its input electrode that lie outside of said range and beyond a given amplitude level, a load impedance having a predetermined resistive component, means for coupling said load impedance to said output electrodes, an output circuit, means for coupling said output circuit to said output electrode, said output circuit having a given amount of capacitance in parallel with said electron discharge means, the resistance of said load impedance being several times greater than the internal impedance of said electron discharge means, and the RC time constant of said load impedance and the capacitance of said output circuit being such as to permit the useful signals provided by the first electron discharge means to appear at the end of the output circuit in a useful form.

13. In signalling apparatus having at one point in its circuit a unidirectional composite signal during normal operating conditions, the composite signal having synchronizing pulses of a predetermined width interposed among intelligence signals, the synchronizing pulses having a greater amplitude than the maximum amplitude that can be attained by the intelligence bearing signals, apparatus for minimizing the effects of spurious noise pulses that have a greater amplitude than the synchronizing signals comprising in combination, limiting means coupled to said point for passing to its output only those portions of the composite signal and the spurious noise pulses that have an amplitude less than a predetermined amplitude level, and means coupled between said point and the output of said limiting means for subtracting from the signals appearing at the output of said limiting means the portions of the spurious noise pulses having an amplitude greater than a predetermined level.

14. In a television receiver having a second detector adapted to recover television modulating signals in which the synchronizing pulses extend in a negative direction, means for minimizing the effects produced by said noise pulses on the synchronizing circuits of the receiver comprising in combination a first amplifier having an anode, a grid and a cathode, an electrical connection between said grid and the output of said second detector for applying the television signals between said grid and said cathode in such polarity that the synchronizing pulses drive said grid in a negative direction with respect to said cathode, a source of fixed positive potential, first and second resistors connected in series between said source and said anode, a second amplifier having an anode, a grid and a cathode, a direct connection between said latter anode and the junction of said first and second resistors means for coupling the cathode and grid of said second amplifier to the output of said second detector in such manner that only portions of the noise pulses having an amplitude greater than the synchronizing pulses can cause said second amplifier to conduct whereby these portions of the noise pulses that pass through said second amplifier appear across said first and second resistors with a polarity that is opposite to the polarity of the noise pulses produced across said second resistor by the action of said first amplifier.

15. In a television receiver having a second detector at which the television signal appears in negative polarity, the signal including video components, synchronizing pulses having a greater amplitude than the video components and noise pulses that may have the same polarity but greater amplitude than said synchronizing components, means for reducing the effects of those portions of the noise pulses having a greater amplitude than the synchronizing pulses comprising in combination a first amplifier having an anode, a grid and a cathode, means for coupling the output of said second detector to said cathode in such polarity that said noise pulses are negative, means for biasing said first amplifier beyond cut-off by an amount such that only a portion of the noise that is negative with respect to the synchronizing pulses is capable of overcoming said cut-off bias and thus rendering said first amplifier conductive, a second amplifier having an anode, a grid and a cathode, means for coupling the television signals appearing at the output of said second detector between the grid and cathode of said second amplifier in such polarity that the synchronizing pulses tend to decrease the conduction in said second amplifier, a source of fixed potential having positive and negative terminals, means for coupling said negative terminal to said cathodes, a load resistor coupled between said positive terminal and said anodes, and an output circuit coupled to said anodes.

16. Means as defined in claim 15 wherein said output circuit has a predetermined amount of capacitance, wherein said load resistor is large in comparison with the plate resistance of either said first and second amplifiers when they are conducting and wherein the RC time constant of said load resistor and the capacitance of said output circuit is short in comparison with the width of the synchronizing pulses.

17. In a television receiver for use in a system wherein the output of its second detector is a composite signal including an intelligence signal occupying a range between zero and a first level, synchronizing signals interposed with said intelligence signals, the synchronizing signals extending from zero to a second level that is beyond the first level, and random noise impulses extending from zero beyond the second level, means for minimizing the effects of the noise impulses comprising in combination electrical means coupled to said second detector for removing all portions of the noise pulses extending beyond a level near the second level, electrical means coupled to said second detector for removing all portions of said composite signal between a predetermined level and zero so that the output of the latter means includes only the portions of the noise impulses extending beyond said predetermined level, and means for combining the outputs of said electrical means in such manner that the portions of the noise impulses contained therein tend to cancel.

18. A means for minimizing the effects of noise as set forth in claim 17, wherein electrical means are provided for varying said predetermined level in accordance with the direct current content of the composite signal.

References Cited in the file of this patent

UNITED STATES PATENTS

| | | |
|---|---|---|
| 1,481,284 | Deardorff | Jan. 22, 1924 |
| 2,166,694 | Selby | July 18, 1939 |
| 2,286,450 | White et al. | June 16, 1942 |
| 2,356,141 | Applegarth | Aug. 22, 1944 |
| 2,438,217 | Johnson | Mar. 23, 1948 |
| 2,450,818 | Vermillion | Oct. 5, 1948 |
| 2,492,943 | White | Dec. 27, 1949 |
| 2,593,011 | Cotsworth | Apr. 15, 1952 |
| 2,717,920 | Avins | Sept. 13, 1955 |
| 2,718,552 | Anderson | Sept. 20, 1955 |

FOREIGN PATENTS

| | | |
|---|---|---|
| 631,377 | Great Britain | Nov. 2, 1949 |

OTHER REFERENCES

Television Zworykin and Morton, 2d ed., John Wiley & Sons, Inc., New York, 1954, Page 730.

FM Television, December 1946, page 27.

QST for July 1950, pages 11–13.